US005619342A

United States Patent [19]
Shannon

[11] Patent Number: 5,619,342
[45] Date of Patent: Apr. 8, 1997

[54] METHOD FOR DETERMINIG A DESTINATION PIXEL LOCATION FROM AN ARBITRARY SOURCE PIXEL LOCATION DURING SCALING OF A BIT MAP IMAGE

[75] Inventor: Terrence M. Shannon, Kuna, Id.

[73] Assignee: Hewlett-Packard Company, Palo Alto, Calif.

[21] Appl. No.: 565,568

[22] Filed: Nov. 30, 1995

[51] Int. Cl.$^6$ .............................. H04N 1/00; G06K 9/42
[52] U.S. Cl. .......................... 358/405; 358/451; 382/298; 382/299
[58] Field of Search ..................................... 358/456, 405, 358/406, 451; 382/291, 292, 293, 294, 295, 298, 299; H04N 1/00

[56] References Cited

U.S. PATENT DOCUMENTS

| | | | |
|---|---|---|---|
| 4,977,398 | 12/1990 | Pleva et al. | 340/793 |
| 5,153,651 | 10/1992 | Kurotaka | 355/271 |
| 5,179,639 | 1/1993 | Taaffe | 395/128 |
| 5,245,327 | 9/1993 | Pleva et al. | 345/147 |
| 5,265,176 | 11/1993 | Miller | 382/47 |
| 5,307,135 | 4/1994 | Amakawa et al. | 355/326 |
| 5,323,247 | 6/1994 | Parker et al. | 358/456 |
| 5,457,772 | 10/1995 | Shannon | 395/109 |
| 5,500,744 | 3/1996 | Sabath | 358/456 |

Primary Examiner—Edward L. Coles, Sr.
Assistant Examiner—Madeleine Au Nguyen

[57] ABSTRACT

A source image is scaled to a destination image using a method which determines a first destination pixel position corresponding to a given source image pixel. The method comprises the steps of: compiling a scale table having one entry per source pixel in a "pixel group", the end destination pixel of a pixel group positioned where a first accumulation (i.e., "Scale Source Sum") of sets of m pixels, equals a second accumulation (i.e., "Scale Destination Sum") of sets n pixels, the Scale Source Sum derived by successively adding an m pixel set value for each successively read source pixel, and the Scale Destination Sum derived by successively adding an n pixel set value for each written destination pixel; factoring both an n source pixel set value and an m destination pixel set value by y, where y is a largest common denominator of both n and m, to derive "n (factored source)" and "m (factored destination)"; using the n(factored source) to determine an integer number of pixel groups between the first source image pixel and the initial source pixel, and determining a total number of destination pixels encompassed by the integer number of pixel groups; determining a position of the given source image pixel within a pixel group on the source raster image scan line; using the scale table to determine a corresponding destination pixel within the pixel group; finding the first destination pixel and positioning the scaled version of the source image thereat.

5 Claims, 1 Drawing Sheet

METHOD FOR DETERMINIG A DESTINATION PIXEL LOCATION FROM AN ARBITRARY SOURCE PIXEL LOCATION DURING SCALING OF A BIT MAP IMAGE

FIELD OF THE INVENTION

This invention relates to the scaling of bit map data from a source pixel map to a destination pixel map of different resolution and, more particularly, to a method for determining a proper position in the destination pixel map of an initial destination pixel representing a given source pixel in the source pixel map.

BACKGROUND OF THE INVENTION

Computer generated color and grey level images are composed of picture elements (pixels), each pixel represented by multiple bits which define either a color or a grey level. In order to represent such images on a bi-level (black and white) printer, the data, if not already grey level, is converted into a grey level multi-bit state and the individual grey level pixels are converted to binary level pixels, using a scaling and dithering process.

Pixels in a source multi-bit per pixel image are usually not at the resolution of the bi-level printer resolution and thus, must be scaled to match the printer's resolution. For instance, many modern printers exhibit a 600 dot-per-inch (dpi) resolution, whereas computers often provide images at a resolution of ⅙th or less than the printer's resolution. Accordingly, either the computer or the printer must spatially scale the lower resolution "source" image pixels to a required "destination" level resolution.

Many computers employ operating systems (such as the Microsoft "Windows" operating system) that require raster operations to be performed on scaled raster data. In such operating systems, it is imperative that any bit map scaling action be accurate and repeatable in a deterministic fashion. In other words, there must be a direct and repeatable correspondence of destination image pixels from each source image pixel, without regard for the scaling starting position in the bit map which represents the source image.

Prior art processes for scaling source bit map image data into destination image bit map data have required that each source pixel be scaled individually to preserve the accurate and deterministic scaling. Where, however, there is a repeat in the source image pixel data (i.e., a plurality of repeated identical pixel values), a "skip ahead" procedure has been utilized which enables the use of a repetition of the destination pixel data. Such a skip ahead procedure is described in U.S. patent application Ser. No. 08/238,277, filed May 3, 1994, entitled "Method to Convert Bit Maps to Monochrome Data," to Poppenga et al., and assigned the same Assignee as this application.

Before a skip ahead procedure can be implemented, an initial destination pixel corresponding to an initial source pixel where the skip ahead procedure is to end, must be identified. There is also a need to find such an initial destination pixel when the destination pixel corresponding to a source pixel commences at an interior pixel in a destination pixel bit map.

While a variety of scaling procedures exist in the prior art, a widely used procedure utilizes a pair of accumulated sums to enable the writing of a plurality of destination pixels which correspond to each succeeding source pixel (assuming a scale-up action). Hereafter, two examples will be given of the prior art scaling procedure, the first employing a 10-to-1 scale-up and the second employing a 3-to-5 scale-up. In the first example, it will be assumed that the source X extent is 60 pixels (the extent of the source bit map in the X direction) and the destination X extent is 600 pixels (the extent of the destination bit map in the X direction). The two variables employed during the procedure are Scale Source Sum and Scale Destination Sum. The scaling rules followed by the procedure are as follows:

1. If Scale Destination Sum is greater than or equal to Scale Source Sum, then read a source pixel and add the destination X extent to the Scale Source Sum.
2. Whenever a destination pixel is written, add the source X extent to the Scale Destination Sum.

Example 1 below illustrates application of the scaling rules set out above.

EXAMPLE 1

Source Extent = 60
Destination Extent = 600

| Scale Src Sum | Scale Dest Sum | Position in Source | Position In Dest | Action to be taken Next |
|---|---|---|---|---|
| *0 | 0 | 0 | 0 | read a source pixel |
| 600 | 0 | 1 | 0 | write a destination pixel |
| 600 | 60 | 1 | 1 | write a destination pixel |
| 600 | 120 | 1 | 2 | write a destination pixel |
| 600 | 180 | 1 | 3 | write a destination pixel |
| 600 | 240 | 1 | 4 | write a destination pixel |
| 600 | 300 | 1 | 5 | write a destination pixel |
| 600 | 360 | 1 | 6 | write a destination pixel |
| 600 | 420 | 1 | 7 | write a destination pixel |
| 600 | 480 | 1 | 8 | write a destination pixel |
| 600 | 540 | 1 | 9 | write a destination pixel |
| *600 | 600 | 1 | 10 | read a source pixel |
| 1200 | 600 | 2 | 10 | write a destination pixel |
| 1200 | 660 | 2 | 11 | write a destination pixel |
| 1200 | 720 | 2 | 12 | write a destination pixel |
| 1200 | 780 | 2 | 13 | write a destination pixel |
| 1200 | 840 | 2 | 14 | write a destination pixel |
| 1200 | 840 | 2 | 14 | write a destination pixel |
| 1200 | 900 | 2 | 15 | write a destination pixel |
| 1200 | 960 | 2 | 16 | write a destination pixel |
| 1200 | 1020 | 2 | 17 | write a destination pixel |
| 1200 | 1080 | 2 | 18 | write a destination pixel |
| 1200 | 1140 | 2 | 19 | write a destination pixel |
| *1200 | 1200 | 2 | 20 | read a source pixel |
| 1800 | 1200 | 3 | 20 | write a destination pixel |
| 1800 | 1260 | 3 | 21 | write a destination pixel |
| 1800 | 1320 | 3 | 22 | write a destination pixel |
| 1800 | 1380 | 3 | 23 | write a destination pixel |
| 1800 | 1440 | 3 | 24 | write a destination pixel |
| 1800 | 1500 | 3 | 25 | write a destination pixel |
| 1800 | 1560 | 3 | 26 | write a destination pixel |
| 1800 | 1620 | 3 | 27 | write a destination pixel |
| 1800 | 1680 | 3 | 28 | write a destination pixel |
| 1800 | 1740 | 3 | 29 | write a destination pixel |
| *1800 | 1800 | 3 | 30 | read a source pixel |

This process continues until all 60 source pixels are read and all 600 destination pixels are written.

Example 2 below illustrates the application of the scaling rules set out above when the source X extent does not evenly divide into the destination X extent. In Example 2, the source X extent is 360 pixels and the destination X extent is 600 pixels, giving a scaling value of 1:1.67.

EXAMPLE 2

Source Extent = 360
Destination Extent = 600

| Scale Src Sum | Scale Position DestSum | Position in Source | In Dest | Action to be taken Next |
|---|---|---|---|---|
| *0 | 0 | 0 | 0 | read a source pixel |
| 600 | 0 | 1 | 0 | write a destination pixel |
| 600 | 360 | 1 | 1 | write a destination pixel |
| 600 | 720 | 1 | 2 | read a source pixel |
| 1200 | 720 | 2 | 2 | write a destination pixel |
| 1200 | 1080 | 2 | 3 | write a destination pixel |
| 1200 | 1440 | 2 | 4 | read a source pixel |
| 1800 | 1400 | 3 | 4 | write a destination pixel |
| *1800 | 1800 | 3 | 5 | read a source pixel |
| 2400 | 1800 | 4 | 5 | write a destination pixel |
| 2400 | 2160 | 4 | 6 | write a destination pixel |
| 2400 | 2520 | 4 | 7 | read a source pixel |
| 3000 | 2520 | 5 | 7 | write a destination pixel |
| 3000 | 2880 | 5 | 8 | write a destination pixel |
| 3000 | 3240 | 5 | 9 | read a source pixel |
| 3600 | 3240 | 6 | 9 | write a destination pixel |
| *3600 | 3600 | 6 | 10 | read a source pixel |
| 4200 | 3600 | 7 | 10 | write a destination pixel |
| 4200 | 3960 | 7 | 11 | write a destination pixel |
| 4200 | 4350 | 7 | 12 | read a source pixel |

This process continues until all 360 pixels are read and all 600 destination pixels are written.

The prior art scaling procedure illustrated above provides a precisely reproducible scaling of a source image to a destination image. To implement the scaling procedure, the Scale Source Sum and Scale Destination Sum must be known at each step of the procedure to enable application of the scaling rules. If, however, a skip ahead procedure is used, the prior art procedure must still be used to calculate the Scale Source Sum and Scale Destination Sum—thereby losing the advantage of the skip ahead procedure.

More specifically, the prior art scaling procedure operates upon one destination pixel at a time and employs the aforesaid Sums to control the scale action from a source pixel to a plurality of destination pixels. However, the skip ahead procedure (described in the aforesaid Poppenga et al. Patent Application) enables the scaling procedure to be accelerated by the writing of a plurality of repeat destination pixel strings that correspond to the repeat source pixels. However, when the repeat stops, the prior art scaling procedure must be again implemented. This action requires that, at some arbitrary location within a destination image, the two aforesaid Sums be re-established to enable the scaling operation to continue.

Accordingly, it is an object of this invention to provide an improved image scaling procedure which enables the full benefits of a skip-ahead procedure to be achieved.

It is another object of this invention to provide an improved scaling procedure which enables precise identification of an initial destination pixel which corresponds to a source pixel located at a given point in an arbitrary source bit map.

It is a further object of the invention to implement an improved scaling procedure which precisely identifies (I) a source pixel in a source image wherein a repeat of pixel values ceases and (ii) a destination pixel in a scaled destination bit map which corresponds to the aforesaid identified source pixel.

SUMMARY OF THE INVENTION

A computer-implemented method enables scaling of a source image of n source pixels per unit dimension to a destination image of m destination pixels per unit dimension. The procedure determines a first destination pixel position corresponding to a given source image pixel that is displaced X source pixels from an initial source pixel on a source image raster scan line. The method comprises the steps of: compiling a scale table having one entry per source pixel in a "pixel group", a "pixel group" encompassing destination pixels from a start destination pixel to an end destination pixel, the end destination pixel positioned where a first accumulation (hereafter called "Scale Source Sum") of sets of m pixels, equals a second accumulation (hereafter called "Scale Destination Sum") of sets n pixels, the Scale Source Sum derived by successively adding an m pixel set value for each successively read source pixel, and the Scale Destination Sum derived by successively adding an n pixel set value for each written destination pixel, wherein each source pixel entry in the scale table includes a Scale Destination Sum value at a first destination pixel which represents the source pixel; factoring both an n source pixel set value and an m destination pixel set value by y, where y is a largest common denominator of both n and m, to derive "n(factored source)" and "m(factored destination)"; dividing X by n(factored source) to determine an integer number of pixel groups between the first source image pixel and the initial source pixel and determining a total number of destination pixels encompassed by the integer number of pixel groups; determining a position of the given source image pixel within a pixel group on the source raster image scan line; further employing the position to determine from the scale table, a corresponding destination pixel within the pixel group; combining the corresponding destination pixel and the determined number of destination pixels to find the first destination pixel position; and positioning a scaled version of the source image in memory, starting at the first destination pixel position.

DETAILED DESCRIPTION OF THE INVENTION

As above described, the prior art scaling rules enable implementation of the procedures shown in Examples 1 and 2. An examination of Examples 1 and 2 indicates that there is a recurring equality between the Scale Source Sum and Scale Destination Sum values as the procedure executes a scaling action. In Example 1 above, when a source pixel is read, the Scale Source Sum and Scale Destination Sum values are equal. It is to be noted that, in Example 1, ten destination pixels are written (0–9) for each source pixel and, thereafter, the procedure repeats. Each of the recurring Sum identity positions is denoted by an asterisk.

In Example 2, where the scaling value is other than an integer number, equalities of Scale Source Sum and Scale Destination Sum are found, but they occur each time three source pixels are read and five destination pixels are written. More specifically, each equality of the Scale Source Sum and Scale Destination Sum occurs after eight pixel operations, on a continuing basis.

Hereafter the term "pixel group" will be used. A pixel group is a grouping of N source pixels which evidence a single repeat of a pattern, wherein the pattern is defined by the recurrence of the Scale Source Sum and Scale Destination Sum values being equal. The recurrence of pixel groups is the basic underlying fact which enables operation of the invention hereof. Notice that each pixel group in Example 1 includes one source bit map pixel and ten destination bit map pixels, whereas, in Example 2, each pixel group contains three source bit map pixels and five destination bit map pixels.

Figure 1:
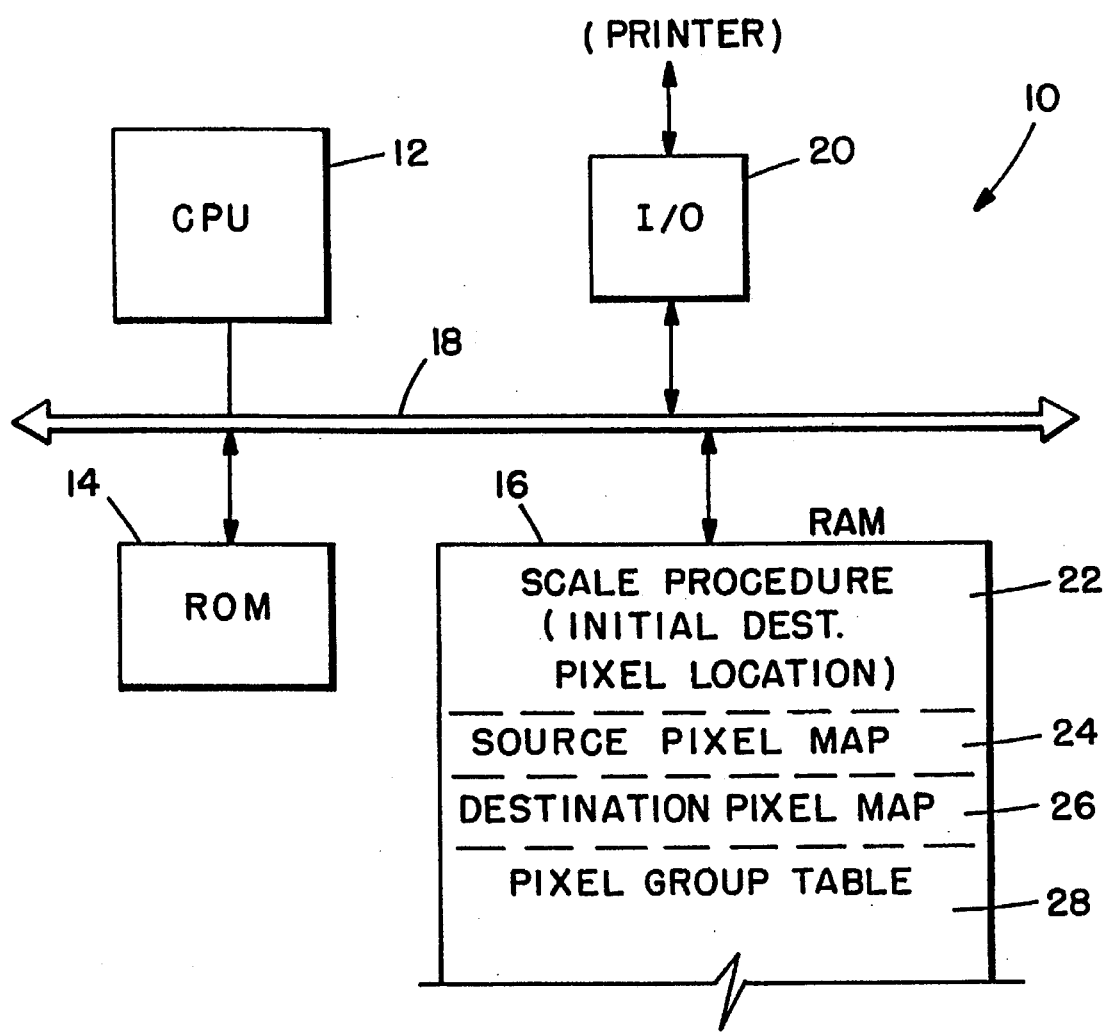
FIG. 1 is a high level block diagram of a computer system for performing the method of the invention.

Turning now to FIG. 1, the block diagram illustrates a system for carrying out the procedure of the invention. A computer 10 includes a central processing unit 12, a read-only memory (ROM) 14 and a random-access memory (RAM) 16. A bus 18 connects each of the aforesaid devices and enables communication therebetween. For the purposes of this explanation, it will be assumed that the procedure of the invention is carried out within computer 10 and that a scaled (and dithered) destination pixel bit map is transmitted via input/output module 20 to a connected printer. Those skilled in the art will understand, however, that computer 10 could also transmit a source pixel bit map to a connected printer where the scaling procedure of the invention could be implemented.

ROM 14 includes a code section which implements a scaling procedure 22 and enables both a skip ahead operation and an identification of initial destination pixel location operation to occur. Within RAM 16 is a source pixel bit map 24, a destination pixel bit map 26, and a pixel group table that is instrumental to the operation of the invention.

Figure 2:
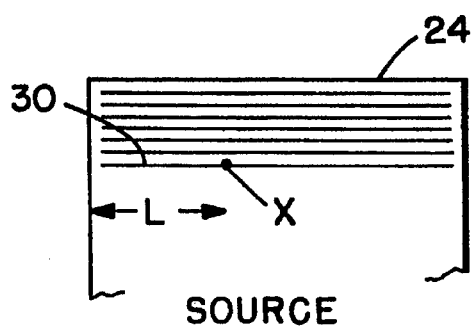
FIG. 2 is a schematic representation of a source image bit map wherein a first source pixel to be subjected to a scaling action is located at a given position within the source image bit map.

In FIG. 2, a schematic of source pixel bit map 24 is shown and includes a source pixel X that is located some number of pixels L from the start of a source raster scan line 30. Assume for the purposes of this explanation, that all pixels falling within distance L have identical grey scale values which will enable a skip ahead procedure to be implemented during a subsequent scaling action. However, in order to perform the skip ahead action, location of a first destination scaled pixel that corresponds to source pixel X must be determined.

Figure 3:
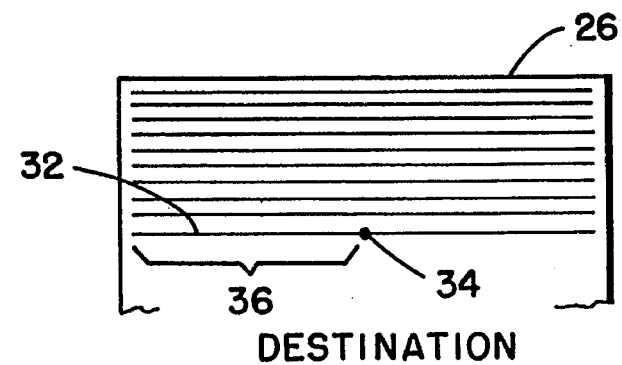
FIG. 3 is a schematic representation of a destination image bit map indicating an initial destination pixel corresponding to the initial source pixel in FIG. 2.

In FIG. 3, destination bit map 26 includes a destination raster line 32 on which a destination pixel 34 resides that will correspond to source pixel X. It is necessary, however, to know the number of destination pixels 36 between the beginning of scan line 32 and destination pixel 34. The procedure to be described below enables the derivation of the position of destination pixel 34 without requiring use of the procedures shown in prior art Examples 1 and 2 above.

Assume that a scaling ratio of 60:600 (as described for Example 1) is to be implemented by scaling procedure 22. The asterisk-marked lines in Example 1 can be defined as "nodes" that begin pixel groups. A node occurs where a Scale Source Sum is equal to a Scale Destination Sum. As indicated above, the scale ratio of 60:600 reduces to an equivalent ratio of 1:10. That ratio is achieved by dividing both the Source Extent (60 source pixels) and the Destination Extent (600 pixels) by a largest common denominator (in this case=60). Thus, the factored Source Extent=1 and the factored Destination Extent=10. As further described above, a pixel group is a grouping of N source pixels which evidence a single repeat of a pattern, wherein the pattern is defined by the recurrence of the Scale Source Sum and Scale Destination Sum values being equal. In the case of the 1:10 pixel group, the repeat occurs after each ten destination pixels.

Using the pixel group concept, each line from Example 1 which corresponds to a first destination pixel scaled from a source pixel is used in a scale-up table. For the 1:10 example, the scale-up table is thus:

| Entry # | Scale Source Sum | Scale Destination Sum | X Distance |
|---------|------------------|----------------------|------------|
| 0       | 600              | 0                    | 0          |

Example 1: Scale-up Table

Using the scale-up table, a correct destination pixel in a destination bit map can be found which corresponds to an arbitrary source pixel in a source bit map. The expression which enables the finding of such a destination pixel is as follows:

Correct destination pixel location=Number of accumulated pixel groups×Factored destination extent+Displacement To calculate the Number of accumulated pixel groups, the given position in the source pixel map of the initial source pixel is divided by the factored Source Extent and any remainder is ignored. Assuming, for example, that a 31st source pixel corresponds to pixel X in FIG. 2, the value 31 is divided by 1, indicating that 31 destination pixel groups exist between the beginning of the respective destination pixel scan line and an initial destination pixel corresponding to the 31st source pixel.

To find Displacement, the modulo of the given source pixel and the factored Source Extent is derived and is then used as an index into the scale-up table to find the number of offset destination pixels within a pixel group. The modulo of 31 and the factored Source Extent is: 31 modulo 1=0. This indicates that the correct entry in the scale-up table is element 0, thereby enabling the offset to be derived to determine where, in the last pixel group, the destination pixel resides which corresponds to the 31st source pixel. In the 1:10 case (trivial), the distance is 0 thereby indicating that the initial destination pixel corresponding to the 31st source pixel is 31 pixel groups of 10 destination pixels each (310 pixels) plus a 0 offset, or 310 pixels from the beginning of the destination scan line.

To enable a continuation of the prior art scaling procedure from the 31st pixel, the scaling variables (Scale Source Sum and Scale Destination Sum) need to be recovered. Such recovery is achieved by accessing an entry in the scale-up table. Because the behavior of the scaling procedure is a function of the difference between the Scale Source Sum and the Scale Destination Sum (and not their actual values), and because their values are equal at the beginning of each pixel group, an entry in the scale-up table provides all the necessary data for re-establishment of the required Sums.

Turning now to the implementation of the invention as it relates to Example 2 above, it will be assumed that the source extent is 360 and the destination extent 600. The ratio of 360:600 reduces to an equivalent ratio of 3:5, so the factored Source Extent=3 and the factored Destination Extent=5. As in Example 1, the lines marked with an asterisk are "nodes" that begin each new pixel group where the Scale Source Sum and Scale Destination Sum values are equal. Note, however, that each pixel group encompasses three source pixels that are read five destination pixels that are written. Thus, even after the number of accumulated pixel groups is calculated, the source pixel may be either a first, second or third source pixel in the last pixel group.

In this case, a scale-up table is created which includes three entries, one entry corresponding to each source pixel in a pixel group. In accordance with the scale-up table shown for Example 1, each source pixel includes a corresponding Scale Source Sum, a Scale Destination Sum and an x distance value. Note that the scale-up table's derivation requires only that a single pixel group be calculated so as to derive the values for a source pixels 0, 1 and 2.

| Entry # | Scale Source Sum | Scale Destination Sum | x Distance |
|---------|------------------|-----------------------|------------|
| 0       | 600              | 0                     | 0          |
| 1       | 1200             | 720                   | 1          |
| 2       | 1800             | 1440                  | 3          |

Example 2; Scale-up Table

As above indicated, to find a correct location in the destination bit map, the following procedure is utilized:

Correct destination location=Number of accumulated pixel groups×Factored Destination Extent+Displacement To calculate the number of accumulated pixel groups, an integer division (divide but ignore the remainder) is performed of the given source pixel in the source bit map by the factored Source Extent. To find the displacement, the modulo is derived of the given source pixel position and the factored Source Extent and is used as an index into the Scale-up table to find the correct×distance.

For example, to find the destination bit map location for the source bit map location of pixel 31, do the following:

1. Take 31 and integer divide it by factored Source Extent. (31:3=10)
2. Multiply the result in step 1 by factored Destination Extent. (10×5=50) Recall, there are 5 destination pixels per pixel group.
3. Take the modulo of 31 and the factored Source Extent and use the resulting value as an index into the Scale-up table.
4. Use the result from step 3 (in this case=1) as an index into the Scale-up table and retrieve the resulting×distance (i.e., 1). The same Scale-up table entry will contain the scaling Sums to be used later in step (6). Note that by taking the modulo of 31, using the factored Source Extent, that the result indicates which source pixel entry in the Scale-up table corresponds to the given source pixel (and destination pixel in the scaled destination image).
5. Add the results from steps 2 and 3 to find the correct location in the destination bit map. (50+1=51). In this example, source bit map pixel location 31 corresponds to destination bit map pixel location 51.
6. To restore the scaling Sums (Scale Source Sum and Scale Destination Sum), take the values stored in the Scale-up table entry retrieved in step (4). These values can be used directly because the behavior of the scaling procedure is a function of the difference between the Scale Source Sum nd Scale Destination Sum, not their actual values. Since the Scale Source Sum and Scale Destination Sum are equal at the beginning of each pixel group, then the scaling behavior preserved for one pixel group stored in the Scale-up table entry will accurately describe the scaling behavior for all pixel groups.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer implemented method for scaling a source image of n pixels per unit measure to a destination image of m pixels per unit measure and for determining a first destination pixel corresponding to a given source image pixel that is displaced X source pixels from an initial source pixel on a source image raster scan line, where $X \geq 0$, said method comprising the steps of:

(a) compiling a scale table having one entry per source pixel in a "pixel group", a "pixel group" encompassing destination pixels from a start destination pixel to an end destination pixel, said end destination pixel positioned where a first accumulation (hereafter called "Scale Source Sum") of sets of m pixels, equals a second accumulation (hereafter called "Scale Destination Sum") of sets n pixels, said Scale Source Sum derived by successively adding m pixel, for each successively read source pixel, and said Scale Destination Sum derived by successively adding n pixels for each written destination pixel, wherein each source pixel entry in said scale table includes a Scale Destination Sum value at a first destination pixel which represents said source pixel;

(b) factoring both a source pixel set of n pixels and a destination pixel set of m pixels by y, where y is a largest common denominator of both n and m, to derive "(factored source)" and "(factored destination)";

(c) dividing X by (factored source) to determine an integer number of pixel groups between said given source image pixel and said initial source pixel, and determining a total number of destination pixels encompassed by said integer number of pixel groups;

(d) determining a position of said given source image pixel within a pixel group on said source raster image scan line and employing said position to determine from said scale table, a corresponding destination pixel within said pixel group;

(e) combining said corresponding destination pixel and said total number of destination pixels determined in step (c) to find said first destination pixel position; and (f) positioning a scaled version of said source image in memory, starting at said first destination pixel position.

2. The method as recited in claim 1, wherein step (d) determines said position of said given source image pixel within a pixel group on said source raster image scan line by performing the substep of;

deriving a modulo of X by n(factored source) to obtain an index value.

3. The method as recited in claim 2, wherein said scale table includes a destination pixel designation corresponding to each source pixel entry and step (d) determines said position of said corresponding destination pixel within said pixel group through use of said index value.

4. The method as recited in claim 3, wherein step (d) uses said index value to access an entry in said scale table which corresponds thereto, said entry including a value which defines a number of destination pixels in a last pixel group which must be added to the total number of destination pixels comprising said integer number of pixel groups.

5. The method as recited in claim 4, comprising the further step of:

employing from said entry accessed in step (d), values of Scale Source Sum and Scale Destination Sum to enable continuation of a scale procedure from said first destination pixel.

* * * * *